Patented Apr. 29, 1930

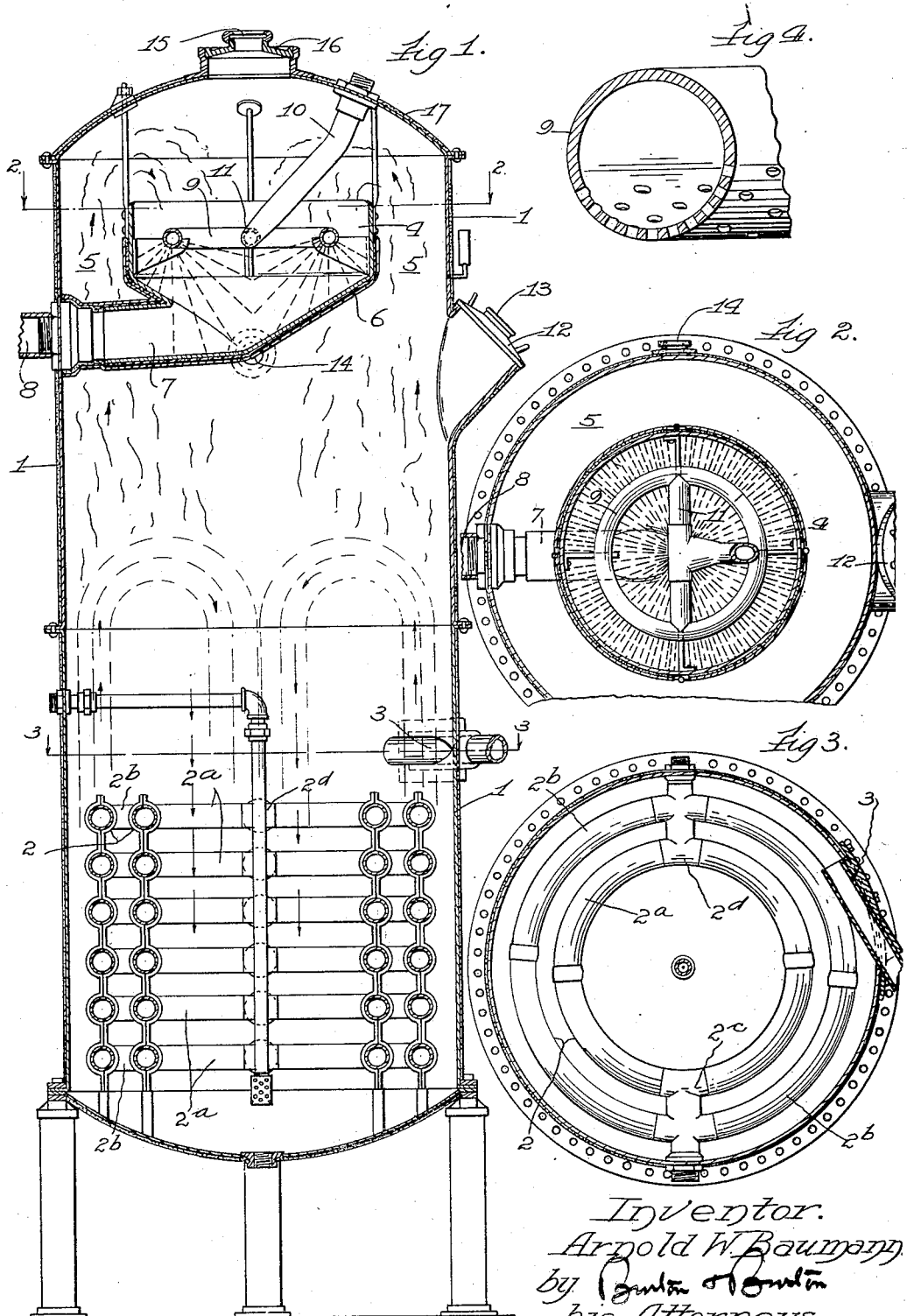

1,756,673

UNITED STATES PATENT OFFICE

ARNOLD W. BAUMANN, OF CHICAGO, ILLINOIS

VACUUM PAN

Application filed January 25, 1926. Serial No. 83,493.

This invention relates to vacuum pans designed for the evaporation and condensation of milk or other liquid and its object is to provide a construction which is economical to manufacture while including a condensing apparatus of higher efficiency than anything now in use. It consists of certain features and elements of construction in combination as herein shown and described and as indicated by the claims.

In the drawings:

Figure 1 is a substantially axial vertical section of an evaporating pan embodying this invention.

Figure 2 is a transverse section taken as indicated at line, 2—2, on Fig. 1.

Figure 3 is a transverse section taken as indicated at line 3—3, on Fig. 1.

Figure 4 is a detail section of the spray pipe.

As shown in the drawings, the apparatus comprises a substantially cylindrical tank, 1, in the lower portion of which there are mounted the steam coils, 2, by which heat is supplied to the milk or other liquid in the cylinder, 1, for evaporating it. Preferably the coils are annular in form comprising an inner ring, $2^a$, and an outer ring, $2^b$, connected at diametrically opposite points by the steam inlet manifold, $2^c$, and an outlet manifold, $2^d$. It will be understood that suitable pipe connections not shown are arranged to communicate with the coils through their couplings which extend through the walls of the cylindrical tank, 1. Preferably just above the location of the steam coils, 2, the milk is supplied to the tank, 1, through a tangential inlet, 3.

It may be understood that the process of evaporation or condensation is assisted by maintaining the vessel, 1, under partial vacuum so that the liquid boils and evaporates without becoming heated to the normal boiling point. Owing to the reduced pressure in the vessel, 1, and the arrangement of the steam coils in annular form near the outer walls of the tank, the liquid under treatment will tend to boil up in the vicinity of the outer walls, rising to a considerable height above the coils, 2, and then falling back at the center or axial portion of the tank under the force of gravity. As the liquid thus rises a portion of its water content evaporates and continues to rise in cylindrical tank, 1, while the residue of thicker liquid returns to the bottom of the vessel.

In the upper portion of the tank, 1, there is located a condensing apparatus for reducing the water vapor to liquid form so that it may be drawn off and disposed of. The condenser as shown consists of a circular trough, 4, axially located so as to leave a substantially clear annular passage or throat-way, 5, between the rim of the trough, 4, and the cylindrical wall of the tank, 1. This provides a practically unobstructed passage-way for the rising vapor directly above the steam coils, 2, which arrangement, together with the fact that the outer surface of the trough, 4, is covered with heat-insulating material, 6, tends to prevent premature condensation of the vapor. Leading from the middle portion of the trough, 4, at the bottom a discharge passage, 7, is connected through the wall of the cylinder, 1, with an exhaust pipe, 8, through which the partial vacuum is maintained by any suitable pumping means, not shown. Thus the suction tends to draw the vapor through the annular throat-way, 5, and downwardly toward the center of the trough, 4.

Within the trough and slightly below its upper rim, I arrange a spray pipe, 9, which is preferably in the shape of a ring and is fed with cold water through an inlet pipe, 10, and diametrically arranged manifold, 11. At the lower side the annular pipe, 9, is perforated to discharge water downwardly in a spray toward the bottom of the trough, 4, so that the vapor drawn downwardly into the trough, 4, comes directly into contact with this cold water and is immediately condensed thereby and flows away with the water through the outlet, 7. This rapid condensation of the vapor causes a further reduction of pressure in the upper portion of the vessel, 1, and tends to accelerate the flow of vapor through the annular passage, 5, and into the condenser trough, 4.

At one side of the tank, 1, a man-hole cover, 12, is shown with a transparent window, 13, for observation of the process. Additional peep holes, 14, are located in the sides of the vessel, 1, as well as at 15, in the top cover, 16. This cover, 16, readily allows access to the trough, 4, for periodically cleaning it and for giving attention to the spray pipe, 9, when required.

It will be seen that with the described arrangement of the condenser trough, 4, centrally located in the cylinder, 1, and with its discharge outlet, 7, exerting suction on the vapor approximately at the center of the tank, the upward pull of the suction will be substantially uniform at all points in the annular passage, 5, so that the volume and velocity of the vapor rising from the liquid as it boils up in the cylinder, 1, is fairly well equalized on all sides of the condenser and the capacity of the tank, 1, may be thus fully developed. It also follows from the central location of the condenser trough, 4, that the vacuum directly below the condenser will be lower than that in the annular passage, 5, and this will permit the condensed liquid to fall back in the axial portion of the tank under the force of gravity without danger of being carried over into the condenser.

I claim:—

1. In evaporating apparatus including an upright tank, a condenser unit in the upper portion centered in the tank to provide an annular passage leading to the space above said unit; the condenser including an upwardly open vessel with an annular spray pipe therein disposed horizontally below the upper edge of the vessel and perforated to discharge a cooling spray distributed over the entire horizontal cross-sectional area of said vessel, the vessel having an outlet disposed below said spray adapted for connection to a source of suction.

2. In the apparatus defined in claim 1, the side walls of said vessel below said spray pipe converging toward the center to produce a gradually diminishing cross section, and the outlet leading from the lowest portion of the vessel.

In testimony whereof, I have hereunto set my hand at Chicago, Illinois, this 21st day of January, 1926.

ARNOLD W. BAUMANN.